United States Patent
Rush et al.

(10) Patent No.: US 10,452,826 B2
(45) Date of Patent: Oct. 22, 2019

(54) VERIFIED AND PRIVATE PORTABLE IDENTITY

(71) Applicant: EyeVerify Inc., Kansas City, MO (US)

(72) Inventors: Toby Rush, Kansas City, MO (US); Riddhiman Das, Kansas City, MO (US); Reza R. Derakhshani, Shawnee, KS (US); Matthew Barrow, Overland Park, KS (US); Casey Hughlett, Lenexa, KS (US); Greg Storm, Parkville, MO (US)

(73) Assignee: EyeVerify Inc., Kansas City, MO (US)

( * ) Notice: Subject to any disclaimer, the term of this patent is extended or adjusted under 35 U.S.C. 154(b) by 0 days.

(21) Appl. No.: 15/806,943

(22) Filed: Nov. 8, 2017

(65) Prior Publication Data

US 2018/0129797 A1   May 10, 2018

Related U.S. Application Data

(60) Provisional application No. 62/420,392, filed on Nov. 10, 2016.

(51) Int. Cl.
| | |
|---|---|
| *G06F 21/00* | (2013.01) |
| *G06F 21/32* | (2013.01) |
| *G06K 9/00* | (2006.01) |
| *G10L 17/00* | (2013.01) |
| *H04L 9/08* | (2006.01) |
| *H04L 9/32* | (2006.01) |

(Continued)

(52) U.S. Cl.
CPC .............. *G06F 21/32* (2013.01); *G06F 21/40* (2013.01); *G06K 9/00288* (2013.01); *G10L 17/005* (2013.01); *H04L 9/0866* (2013.01); *H04L 9/3271* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 6,725,383 B2 * | 4/2004 | Kyle | G06K 9/00221 713/182 |
| 6,920,435 B2 * | 7/2005 | Hoffman | G06F 21/32 705/18 |

(Continued)

FOREIGN PATENT DOCUMENTS

WO   WO-2009/146315 A1   12/2009

OTHER PUBLICATIONS

International Search Report for International Application No. PCT/US2017/060572, dated Feb. 22, 2018 (6 pages).

(Continued)

*Primary Examiner* — Maung T Lwin
(74) *Attorney, Agent, or Firm* — Goodwin Procter LLP

(57) ABSTRACT

A biometric template created at a user device is divided into portions that are distributed among members of a trusted circle and, optionally, a remote storage service. When the user associated with the biometric template attempts to reauthenticate on a different user device, live identity information is captured and transmitted to trusted circle members. The members confirm the identity of the user and provide the biometric template portions to the different device for reconstruction of the original template. The user can then biometrically reauthenticate using the reconstructed template.

20 Claims, 4 Drawing Sheets

(51) Int. Cl.
*H04L 29/06* (2006.01)
*G06F 21/40* (2013.01)

(56) References Cited

U.S. PATENT DOCUMENTS

| | | | |
|---|---|---|---|
| 8,832,788 B1 | 9/2014 | Gibson et al. | |
| 9,141,150 B1* | 9/2015 | Trundle | G06F 1/1694 |
| 9,177,131 B2* | 11/2015 | Zhang | G06F 21/32 |
| 2007/0112775 A1* | 5/2007 | Ackerman | G06F 21/32 |
| 2008/0019573 A1* | 1/2008 | Baltatu | G06F 21/32 |
| | | | 382/115 |
| 2010/0115114 A1* | 5/2010 | Headley | G06F 21/32 |
| | | | 709/229 |
| 2010/0119061 A1* | 5/2010 | Kawale | H04L 9/302 |
| | | | 380/44 |
| 2011/0302420 A1* | 12/2011 | Davida | G06F 21/32 |
| | | | 713/180 |
| 2011/0302645 A1* | 12/2011 | Headley | H04L 9/3215 |
| | | | 726/7 |
| 2012/0169463 A1 | 7/2012 | Shin et al. | |
| 2012/0198532 A1* | 8/2012 | Headley | G06F 21/32 |
| | | | 726/7 |
| 2014/0044318 A1* | 2/2014 | Derakhshani | G06K 9/00597 |
| | | | 382/117 |
| 2014/0115695 A1* | 4/2014 | Fadell | G06F 21/316 |
| | | | 726/19 |
| 2014/0283014 A1* | 9/2014 | Tse | G06F 21/32 |
| | | | 726/19 |
| 2014/0310786 A1* | 10/2014 | Harding | H04L 63/0861 |
| | | | 726/5 |
| 2015/0143496 A1* | 5/2015 | Thomas | G06F 21/34 |
| | | | 726/7 |
| 2016/0066184 A1* | 3/2016 | Bhargav-Spantzel | G06F 21/40 |
| | | | 726/7 |
| 2016/0117544 A1* | 4/2016 | Hoyos | H04N 5/23219 |
| | | | 348/78 |
| 2016/0182502 A1* | 6/2016 | Smith | H04L 63/0861 |
| | | | 726/7 |
| 2017/0006028 A1* | 1/2017 | Tunnell | H04L 63/0861 |
| 2017/0295173 A1* | 10/2017 | Walsh | H04L 63/0861 |

OTHER PUBLICATIONS

Written Opinion for International Patent Application No. PCT/US2017/060572, dated Feb. 22, 2018 (9 pages).

* cited by examiner

VERIFIED AND PRIVATE PORTABLE IDENTITY

CROSS-REFERENCE TO RELATED APPLICATION

This application claims priority to and the benefit of U.S. Provisional Patent Application No. 62/420,392, filed on Nov. 10, 2016, and entitled "Verified and Private Portable Identity," the entirety of which is incorporated by reference herein.

TECHNICAL FIELD

The present disclosure generally relates to identity verification and, more specifically, to systems and methods for verifying a user's identity using a distributed biometric template.

BACKGROUND

It is often desirable to restrict access to property or resources to particular individuals. Biometric systems can be used to authenticate the identity of an individual to either grant or deny access to a resource. For example, eye scanners can be used by a biometric security system to identify an individual based on unique structures in the individual's sclera or iris. Some devices, such as smartphones, tablets, and laptops, implement biometric verification techniques that use a sensor integrated into the device to capture one or more features of a user. For example, a fingerprint reader can capture the features of a user's fingerprint, an image sensor can capture an image of a user's eye or face, and a microphone can receive a sample of a user's voice. In some instances, information used to verify a user's identity can be securely stored on the user's device. However, when the user changes devices, this information may not be available, requiring the user reestablish trust. Techniques are needed to facilitate the process of reestablishing a user's identity on a different device.

SUMMARY

Systems and methods are disclosed herein for porting a biometric identity among multiple devices. In one aspect, a biometric template associated with a user is created at a first user device and is divided into a plurality of portions, which are distributed among a plurality of other devices. A request to authenticate the user is received at a second user device, which captures live identity information associated with the user. The live identity information is transmitted to at least some of the other devices. Upon confirmation of an identity of the user by at least some of the other devices, the second user device receives a set of the portions of the biometric template from at least some of the other devices. The biometric template is reconstructed from the set of portions of the biometric template and the user is authenticated at the second user device using the reconstructed biometric template. Other aspects of the foregoing include corresponding systems having processors programmed to perform functions defined by computer-executable instructions stored on memories and computer-executable instructions stored on non-transitory computer-readable storage media.

Implementations of the foregoing aspects can include one or more of the following features. Distributing the portions of the biometric template can include distributing, to each other device, fewer portions of the biometric template than is necessary to reconstruct the biometric template. Distributing the portions of the biometric template can include distributing redundant copies of the portions among at least some of the other devices. The other devices can include a plurality of other user devices and a remote storage service. The live identity information can include at least one of a live video recording of the user and a live audio recording of the user. The biometric template can include a biometric component for identifying a user and a key generation component decoupled from the biometric component for generating a private key of the user and portions or more of the key generation component of the biometric template can be distributed among the other devices. The key generation component of the reconstructed biometric template can be used to determine a private key associated with the user for use on the second user device, where the private key preserves authentications previously made on the first user device. The set of portions can be received from at least one of: one or more of the other devices that confirmed the identity of the user, one or more of the other devices that did not confirm the identity of the user, and a remote storage service. As part of confirmation of the identity of the user, a challenge from a user of a first one of the other devices can be received and a response to the challenge can be transmitted to the user of the first other device. A shared key can be distributed among the other devices and reconstructing the biometric template can include using the shared key to decrypt the set of the portions of the biometric template.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DETAILED DESCRIPTION

The present disclosure is directed to techniques for providing a trusted and private portable identity platform that utilizes, in various implementations, multimodal biometrics, social networks, and distributed storage in order to provide a portable identity. In essence, the disclosed techniques provide for the ability of a user to transport his or her trusted identity (an identity that has been authenticated or otherwise established) from one device to another. As one example, a user can establish his identity on his smartphone and generate a private key in the process using biometric verification based on any suitable characteristics, e.g., vascular and other patterns on the white of the eye or iris, fingerprints, facial features, voice, etc. The verified identity can be associated with saved logins, tokens, keys, and other forms of authentication on the user's device, such that the user need only biometrically verify his or her identity to obtain access to applications, websites, services, data, and so on, that use the various forms of authentication to control access.

In the event the user switches to a different device on which he has not established his identity (e.g., a new smartphone), he would normally have to reenter his login information, passwords, engage in multifactor authentication, or obtain tokens or keys to reauthenticate with those applications, websites, services, and the like that are accessible on or through the different device, thereby reestablishing trust that he is indeed the original genuine claimant. The presently disclosed techniques solve this problem by providing for the creation of a portable identity by which a user can easily reestablish his identity on a different device. This is achieved by reconstructing an earlier trusted biometric template that can be used to verify the user's identity on the different device from portions of the template that have been distributed among and received back from members of the user's trusted circle. These members participate in the process by verifying the user's identity based on information associated with the user, such as a live captured audiovisual recording of the user.

Figure 1:
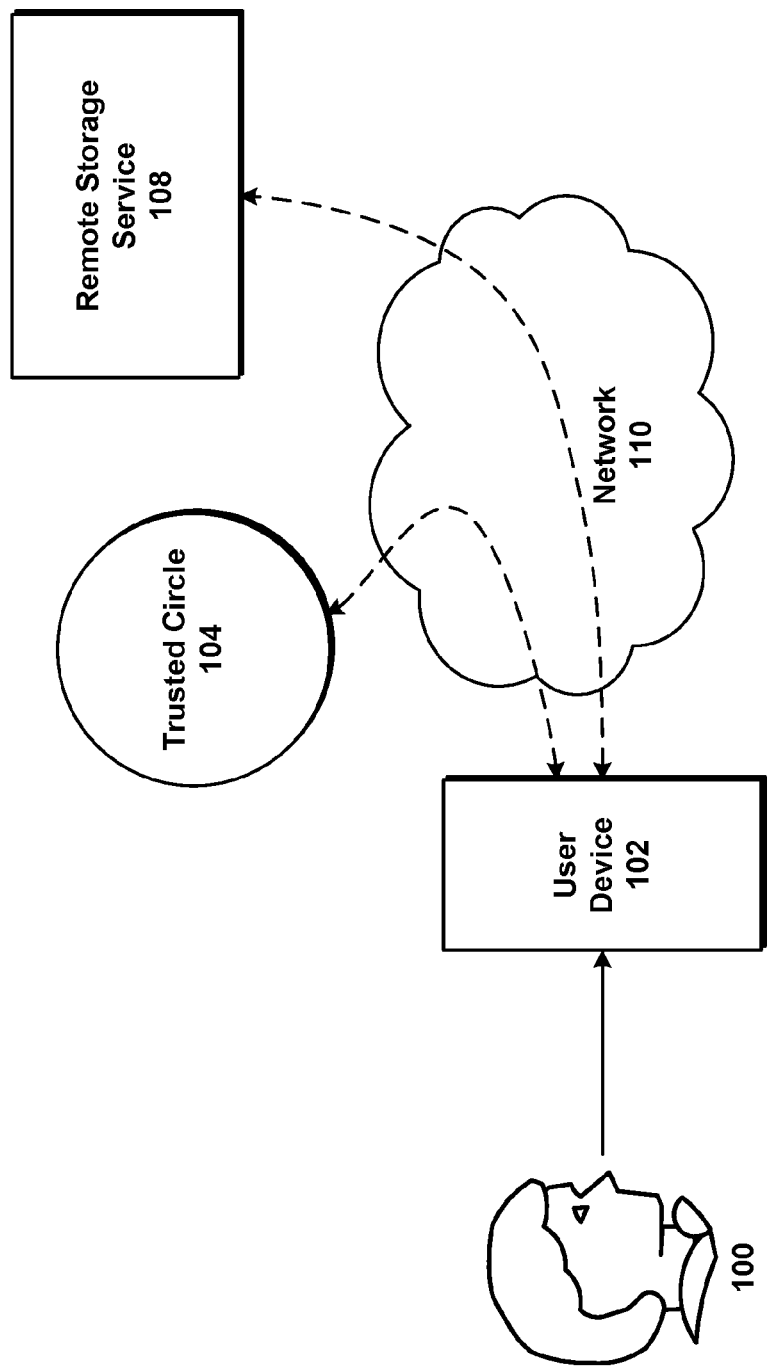
FIG. 1 depicts an example high-level architecture of a system on which the trusted and private portable identity techniques disclosed herein are implemented.

FIG. 1 depicts a high-level architecture implementing these techniques, including a user device 102 operated by a user 100, a trusted circle 104, and a remote storage service 108, each of which communicate over a network 110. User device 102 can be a mobile device, such as a smartphone, tablet, or laptop, or other computing device having a processor, memory, and functionality to capture image, video, and/or audio (e.g., a digital camera, microphone, etc.). User device 102 can execute thereon one or more applications (e.g., a mobile app) that can perform biometric enrollment and verification and distribute/receive biometric template portions to/from trusted circle 104 and, optionally, remote storage service 108. The application can also provide an interface for user 100 to add other users to his trusted circle 104. Transmission of template data can performed in a peer-to-peer fashion, with direct connections between user device 102 and devices in trusted circle 104, and/or can be performed indirectly through services on remote servers provided by, for example, the application provider.

Trusted circle 104 can include multiple users having some relationship with user 100 (e.g., trusted friends, members of the user's social network, etc.) and that would be able to manually (and/or with the help of trusted biometric algorithms) confirm, with some confidence, whether user 100 is who he claims to be based on, e.g., video, imagery, or audio of user 100, challenge questions presented to user 100, and the like. Users in trusted circle 104 can have devices executing applications that can send/receive the biometric template portions associated with user 100 and allow the users to confirm the identity of user 100, optionally enabling the user to retrieve his private keys or other cryptographic data needed to reestablish trust and linkage to applications, services, data, etc. on his new device or point of service. The user need not know or be aware of the aforementioned private keys; rather, the user's biometrics can securely bind or save them for the functionalities requested by the user.

Remote storage service 108 can include one or more remote servers for the optional storage of one of more biometric template portions associated with user 100. Such portion(s) can be retrieved from remote storage service 108 in the event that, for example, an insufficient number of users in trusted circle 104 is available to confirm the identity of user 100, or a sufficient number of users in trusted circle 104 confirms the user's identity, but those users, taken together, do not have all the required portions of the biometric template. The distributed biometric template portions can be inert in and of themselves, i.e., each does not carry any functional or otherwise privacy and security compromising information that can be derived from that portion alone. In one implementation, the bits reserved for each portion are chosen in a structured (e.g., block-wise or pseudo-random) fashion from a lossless compressed version of the template. In some other implementations, a private key or other piece(s) of information needed to inflate or otherwise reassemble the inert distributed template portions on the user's device or elsewhere can also be distributed and retrieved from the trusted circle in a fashion similar to the biometric template portion techniques described herein.

Figure 2:
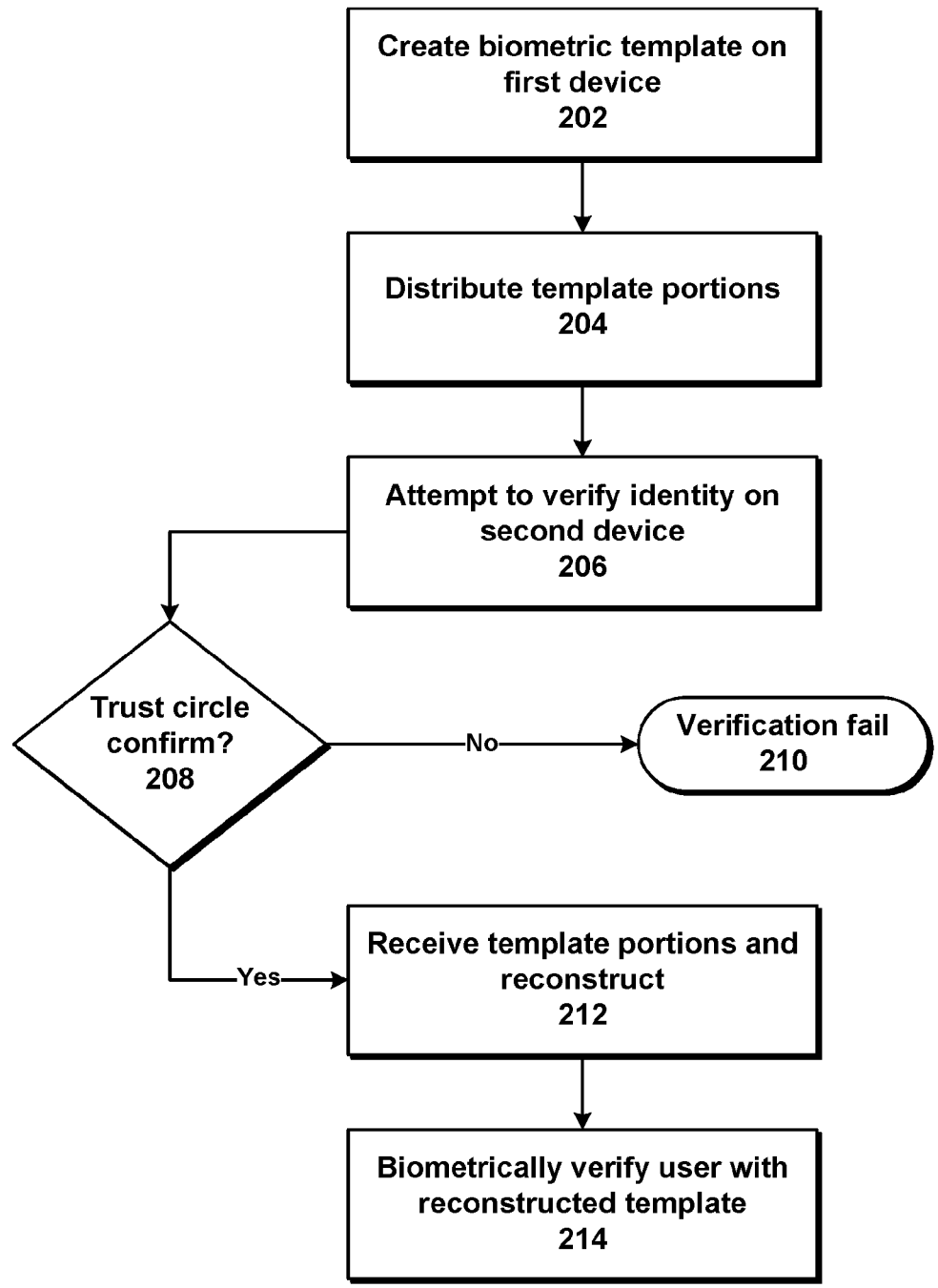
FIG. 2 depicts a flowchart of a method of providing a trusted and private portable identity according to an implementation.

FIG. 2 depicts an example method of providing a trusted and private portable identity according to one implementation. In Step 202, a user establishes his identity on a user device and a biometric template (e.g., an enrollment template) based on one or more features of the user (e.g., eye vein patterns, fingerprint, voiceprint, etc.) is created. A private key for the user (which can be used to authenticate the user on the user device and in applications) is bound to or encoded into the biometric template and the template is compressed and spliced into two or more portions. For purposes of illustration, here, the compressed biometric template is split in four portions A, B, C, and D; however, any practical number of portions can be used. The number of portions can be a fixed number, random number, or can vary based on the number of users in the trusted circle.

The template portions are distributed among individual devices of other users in the user's trusted circle (Step 204). In some implementations, each individual device in the trusted circle receives one template portion. In other implementations, trusted circle devices receive multiple portions, but not enough to reconstruct the template. There can be redundancy in the distribution; for example, the same template portion can be sent to multiple other devices so that in case some devices are not available (e.g., offline), the duplicate portions can cover for the missing elements. In one implementation, at least approximately six members are included in the trusted circle in order to provide a sufficient number of trusted members for redundancy and availability of template portions. Inert template portions (e.g., scrambled and encrypted) can also optionally be distributed to a remote server or private or commercially available remote storage service, such as a cloud storage service, which can be provided by the provider of the biometric application or some other third party.

Figure 3:
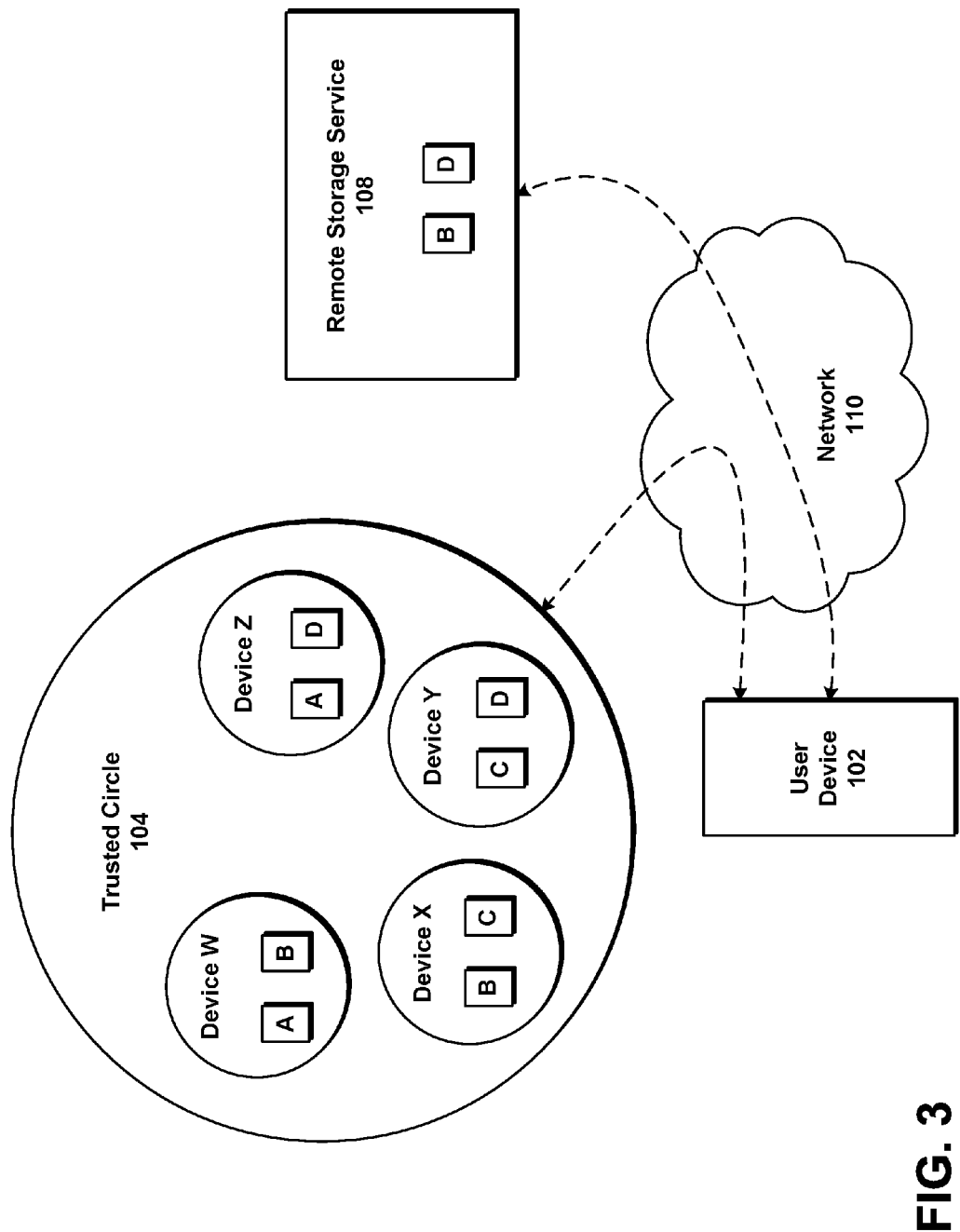
FIG. 3 depicts an example distribution of biometric template portions among recipients using the system of FIG. 1.

Referring also now to FIG. 3, in the present example, the four portions are distributed among four devices W, X, Y, and Z in trusted circle 104 and remote storage service 108. Here, each recipient of a template portion holds two different portions; however, it is not required that each recipient holds the same number of portions. Further, in some implementations, not all trusted circle members are provided with a template portion. In other implementations, no remote storage service(s) are provided with a portion. As depicted, some of the template portions are redundantly distributed among the recipients. Specifically, portion A is transmitted to Devices W and Z; portion B is transmitted to Devices W and X and remote storage service 108; portion C is transmitted to Devices X and Y; and portion D is transmitted to Devices Y and Z and remote storage service 108. User device 102 can transmit each template portion to the devices in trusted circle 104. Some implementations include peer-to-peer communication among devices in a trusted circle, in which such devices can share portions among themselves to achieve a desired level of redundancy of template portions.

In the event that the template portions are scrambled and/or encrypted, the required key pieces for reverse operations (e.g., decrypting, descrambling) also can be distributed among members of the circle of trust (and, in some instances, the remote storage service) and will be provided back to the requesting user after verifying and confirming trust in the identity of the user. In some implementations, an additional shared encryption and/or scrambling key is distributed among the trusted circle to serve as an added layer of security. As an example, a secondary layer of encryption can be added by designating this shared key as what is required for decompressing and reassembling the distributed template on the original user's device.

Figure 4:
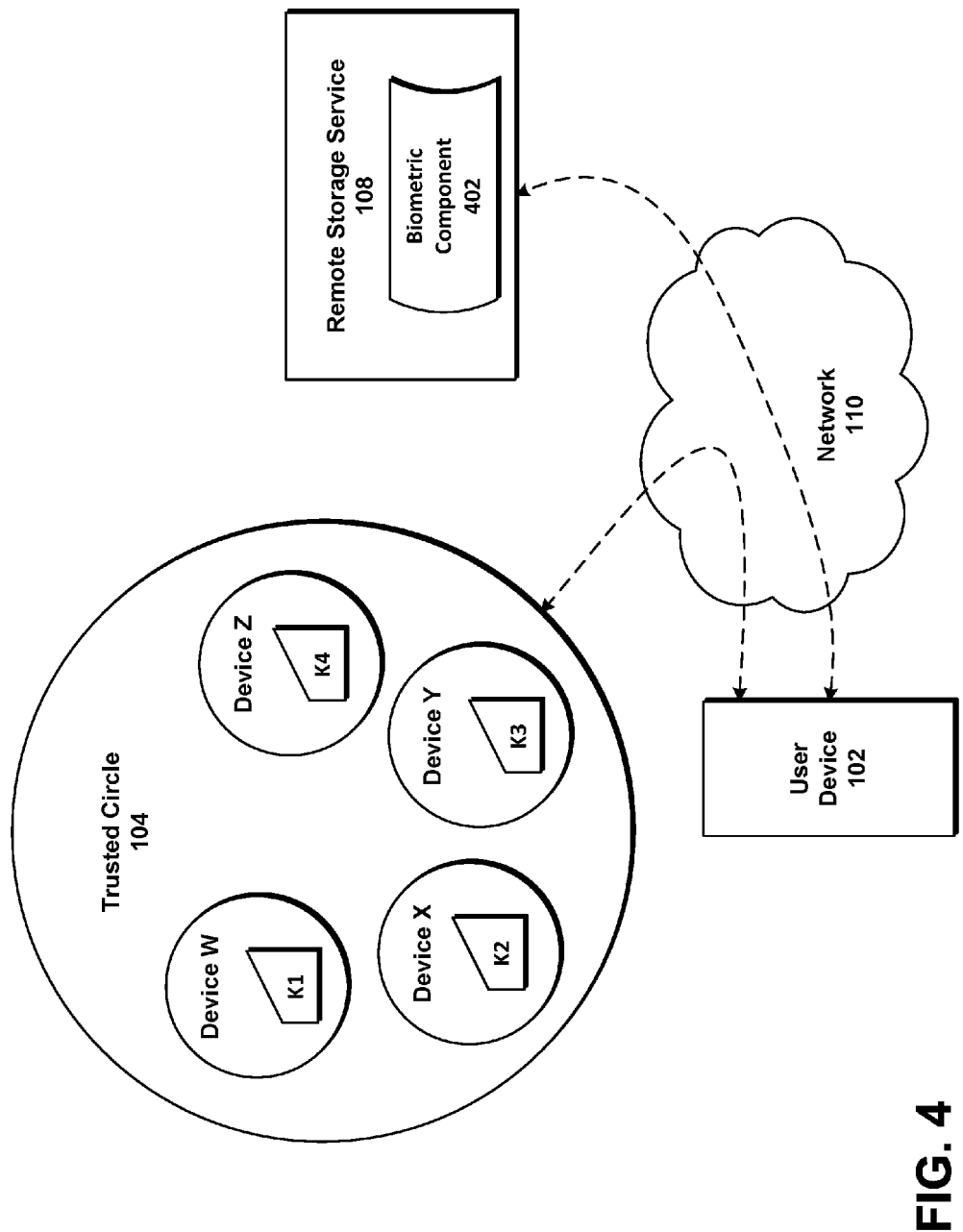
FIG. 4 depicts an example distribution of key generating components of a biometric template among recipients using the system of FIG. 1.

In one implementation, the private key generating component of the template is decoupled from the biometric component of the template. For example, as shown in FIG. 4, the biometric component 402 of the template, which can be used for identification, is stored in whole on remote storage server 108 to allow for de-duplication or other functionality, such as helping with template portability. The key generating component, including portions K1, K2, K3, and K4, is securely distributed among the user's circle of trust (to Devices W, X, Y, and Z, respectively) in a manner described above in order to reestablish key generation functionality on a new device or point of service. In this example, once the identity of the user of user device 102 is verified, biometric component 402 is received from remote storage service 108, key generating component portions K1, K2, K3, and K4 are retrieved from the trusted circle 104 and combined, and the received components are descrambled or decrypted as needed, and the original biometric template is reconstructed. The biometric template can then be used to biometrically validate the user and allow for private key generation and reauthentication as described herein. In other implementations, the biometric component and the key generating component are both distributed among the circle of trust and/or a remote storage service, and each component can be kept whole or divided into portions for later reconstruction on behalf of a user requesting identity verification.

Referring back to FIG. 2, in Step 206, at a later time, the original user attempts to verify his identity and authenticate himself on a new device. As part of this process, information about the user is captured by the new device. Such information can include, for example, a short audiovisual clip of the user requesting authentication and provisioning on the new device, as well as an indication of date and time in order to provide evidence that the user's request is current. The user information is then distributed to all or a subset of the user devices in the trusted circle. Those trusted users can then review the information and take a responsive action (Step 208). Such action can be a confirmation that the user is who he claims to be, a denial of the user's claim, or a request for more information (e.g., pose a challenge question in real-time to the user and review the response). For instance, if a trusted user does not believe that the received information is sufficient to validate the identity of the original user, the trusted user can provide a challenge in text, audio or video recording, or other form, or establish real-time communication with the original user in order to present the challenge. If the trusted user is satisfied with the response to the challenge, the trusted user can confirm the original user's identity. In some implementations, the users in the trusted circle are required to biometrically verify their own identities on their respective devices before they can confirm or deny the identity of the original user.

In some implementations, all trusted users to which the information was sent are required to confirm the original user's identity to permit reconstruction of the user's biometric template. In other implementations, only a threshold number of confirmations is required (e.g., 50%, 75%, etc.), which is related to the extent of overlap of distributed template information in the circle of trust (e.g., the more the overlap, the more likely that a smaller number of trusted members of one's network are needed to reconstruct the identity). In further implementations, template reconstruction can proceed once a sufficient set of template portions is available from trusted users who have confirmed the original user's identity. In yet other implementations, reconstruction of the template is not permitted, if a certain number of the users in the trusted circle (e.g., one, two, or more) have flagged the received information as potentially not depicting the original user. In one example, about three to five confirmations from the trusted circle are needed to reconstitute a biometric template.

If not enough trusted users confirm the original user's identity or the biometric template portions are otherwise unavailable, the user verification fails (Step 210). However, if confirmation succeeds, the biometric template can be reconstructed from portions received from the trusted circle (Step 212). The reconstruction can occur on the user's new device, on a remote server, or elsewhere. The template portions can be received from only the users in the trusted circle that confirmed the original user's identity or, in some instances, once enough users have confirmed, template portions can be retrieved from any users in the trusted circle, as needed. In some implementations, one or more template portions are received from a remote storage or cloud service, as well, along with a template protection key from the trusted circle. The template protection key can be a private key needed to decrypt and/or unscramble the union of template pieces received by the user. Referring to the example in which the template is divided into four portions (A, B, C, and D), portions A and C are received from the trusted circle, and B and D (which are otherwise useless without trusted circle confirmation) are received from a remote server. The four portions are then reassembled and decompressed to form the original user's biometric template. In some implementations, where the distributed template is further compressed, scrambled, and encrypted by the original user prior to distribution of its portions to the trusted circle (and optionally a remote storage server) for future portability, the decrypting and unscrambling private key portions are also distributed by the user to some or all of his trusted circle members.

In Step 214, following reconstruction of the original user's template, the user biometrically verifies his identity using the template, which provides for either the retrieval of the user's personal private key bound to the template or regeneration of the key, in cases that the biometric template is capable of private key generation/release. The availability of the private key on the new device can then be used to preserve any associated cryptographic handshakes and other existing authentications with previously connected applications and services and therefore allow access to the related functionality offered by such applications and services. In some implementations, blockchain techniques can further facilitate distributed crypto-security, trust, and authentication.

Generally, the systems and techniques described here can be implemented in a computing system that includes a single computing device in communication with other computing devices, or that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and can interact through a communication network. The relationship of client and server arises by virtue of computer programs running on the respective computers and having a client-server relationship to each other. In some embodiments, a server transmits data (e.g., image data) to a client device (e.g., for purposes of displaying data to and receiving a response to an operation performed on the data). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A non-transitory computer storage medium can be, or can be included in, a computer-readable storage device, a computer-readable storage substrate, a random or serial access memory array or device, or a combination of one or more of them. Moreover, while a non-transitory computer storage medium is not a propagated signal, a computer storage medium can be a source or destination of computer program instructions encoded in an artificially-generated propagated signal. The computer storage medium can also be, or can be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and distributed computing and grid computing infrastructures.

A computer program (also known as a program, software, software application, script, or code) can be written in any form of programming language, including compiled or interpreted languages or declarative or procedural languages and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource) in a single file dedicated to the program in question or in multiple coordinated files (e.g., files that store one or more modules, sub-programs, or portions of code). A computer program can be deployed to be executed on one computer or on multiple computers that are located at one site or distributed across multiple sites and interconnected by a communication network.

While this specification contains many specific implementation details, these should not be construed as limitations on the scope of the inventions or of what is claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments and it should be understood that the described program components and systems can generally be integrated together in a single software product or packaged into multiple software products. Thus, particular embodiments of the subject matter have been described. Other embodiments including various combinations and permutations are within the scope of the following claims, as well as equivalents. In some cases, the actions recited in the claims can be performed in a different order and still achieve desirable results.

What is claimed is:

1. A computer-implemented method involving a plurality of different devices comprising a first user device, a second user device, and a first plurality of devices not including the first and second user devices, the method comprising:
creating, at the first user device, a biometric template associated with a user;
dividing the biometric template into a plurality of portions that, taken individually, cannot be used to confirm an identity of the user;
distributing the portions of the biometric template among the first plurality of devices, the first plurality of devices comprising a device associated with a trusted user different from the user;
receiving, at the second user device, a request to authenticate the user;
capturing, by the second user device, live identity information associated with the user;
transmitting the live identity information to a second plurality of devices comprising at least a subset of the first plurality of devices, the second plurality of devices further including the device associated with the trusted user, wherein the live identity information is presented, using the device being associated with the trusted user and having stored thereon at most a portion of the biometric template that cannot by itself be used to confirm an identity of the user, to the trusted user for manual confirmation of an identity of the user by the trusted user;
upon confirmation of the identity of the user by a third plurality of devices comprising at least a subset of the second plurality of devices, such confirmation including the manual confirmation by the trusted user, receiving, at the second user device, a set of the portions of the biometric template from one or more devices in the third plurality of devices;
reconstructing the biometric template from the set of portions of the biometric template; and
authenticating the user using the reconstructed biometric template at the second user device.

2. The method of claim 1, wherein distributing the portions of the biometric template comprises distributing, to each device in the first plurality of devices, fewer portions of the biometric template than is necessary to reconstruct the biometric template.

3. The method of claim 1, wherein distributing the portions of the biometric template comprises distributing redundant copies of the portions among at least some of the devices in the first plurality of devices.

4. The method of claim 1, wherein the first plurality of devices comprises a plurality of other user devices and a remote storage service.

5. The method of claim 1, wherein the live identity information comprises a live video recording of the user and/or a live audio recording of the user.

6. The method of claim 1, wherein the biometric template comprises a biometric component for identifying the user and a key generation component decoupled from the biometric component for generating a private key of the user, the method further comprising distributing at least portions of the key generation component of the biometric template among the first plurality of devices.

7. The method of claim 6, further comprising using the key generation component of the reconstructed biometric template to generate the private key of the user for use on the second user device, wherein the private key preserves authentications previously made on the first user device.

8. The method of claim 1, wherein receiving the set of portions comprises receiving portions from:
one or more devices in the third plurality of devices;
one or more devices in the second plurality of devices that did not confirm the identity of the user; and/or
a remote storage service.

9. The method of claim 1, further comprising, as part of confirmation of the identity of the user:
receiving a challenge from a user of a first device in the second plurality of devices; and
transmitting a response to the challenge to the user of the first device in the second plurality of devices.

10. The method of claim 1, further comprising distributing a shared key among the first plurality of devices, wherein reconstructing the biometric template comprises using the shared key to decrypt the set of the portions of the biometric template.

11. A system comprising:
a first user device and a second user device, each comprising a respective processor and a memory storing computer-executable instructions, wherein the first user device is programmed to perform the steps of:
creating a biometric template associated with a user;
dividing the biometric template into a plurality of portions that, taken individually, cannot be used to confirm an identity of the user; and
distributing the portions of the biometric template among a first plurality of devices not including the first user device and the second user device, the first plurality of devices comprising at least one device associated with a trusted user different from the user; and
wherein the second user device is programmed to perform the steps of:
receiving a request to authenticate the user;
capturing live identity information associated with the user;
transmitting the live identity information to a second plurality of devices comprising at least a subset of the first plurality of devices, the second plurality of devices further including the device associated with the trusted user, wherein the live identity information is presented, using the device being associated with the trusted user and having stored thereon at most a portion of the biometric template that cannot by itself be used to confirm an identity of the user, to the trusted user for manual confirmation of an identity of the user by the trusted user;
upon confirmation of the identity of the user by a third plurality of devices comprising at least a subset of the second plurality of devices, such confirmation including the manual confirmation by the trusted user, receiving, at the second user device, a set of the portions of the biometric template from one or more devices in the third plurality of devices;
reconstructing the biometric template from the set of portions of the biometric template; and
authenticating the user using the reconstructed biometric template.

12. The system of claim 11, wherein distributing the portions of the biometric template comprises distributing, to each device in the first plurality of devices, fewer portions of the biometric template than is necessary to reconstruct the biometric template.

13. The system of claim 11, wherein distributing the portions of the biometric template comprises distributing redundant copies of the portions among at least some of the devices in the first plurality of devices.

14. The system of claim 11, wherein the first plurality of devices comprises a plurality of user devices and a remote storage service.

15. The system of claim 11, wherein the live identity information comprises a live video recording of the user and/or a live audio recording of the user.

16. The system of claim 11, wherein the biometric template comprises a biometric component for identifying the user and a key generation component decoupled from the biometric component for generating a private key of the user, wherein the first user device is further programmed to perform the step of distributing at least portions of the key generation component of the biometric template among the first plurality of devices.

17. The system of claim 16, wherein the second user device is further programmed to perform the step of using the key generation component of the reconstructed biometric template to generate the private key of the user for use on the second user device, wherein the private key preserves authentications previously made on the first user device.

18. The system of claim 11, wherein receiving the set of portions comprises receiving portions from:
   one or more devices in the third plurality of devices;
   one or more devices in the second plurality of devices that did not confirm the identity of the user; and/or
   a remote storage service.

19. The system of claim 11, wherein the first user device is further programmed to perform the steps of, as part of confirmation of the identity of the user:
   receiving a challenge from a user of a first device in the second plurality of devices; and
   transmitting a response to the challenge to the user of the first device in the second plurality of devices.

20. The system of claim 11, wherein the first user device is further programmed to perform the step of distributing a shared key among the first plurality of devices, and wherein reconstructing the biometric template comprises using the shared key to decrypt the set of the portions of the biometric template.

* * * * *